(12) United States Patent
Banhos et al.

(10) Patent No.: US 10,330,012 B2
(45) Date of Patent: Jun. 25, 2019

(54) BRACKETS FOR GAS TURBINE ENGINE COMPONENTS

(71) Applicant: UNITED TECHNOLOGIES CORPORATION, Farmington, CT (US)

(72) Inventors: Jonas S. Banhos, New Haven, CT (US); Joo Sub Rhee, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 356 days.

(21) Appl. No.: 15/116,408

(22) PCT Filed: Jan. 15, 2015

(86) PCT No.: PCT/US2015/011579
§ 371 (c)(1),
(2) Date: Aug. 3, 2016

(87) PCT Pub. No.: WO2015/119754
PCT Pub. Date: Aug. 13, 2015

(65) Prior Publication Data
US 2016/0348587 A1    Dec. 1, 2016

Related U.S. Application Data

(60) Provisional application No. 61/935,703, filed on Feb. 4, 2014.

(51) Int. Cl.
*F01D 11/24* (2006.01)
*F02C 7/12* (2006.01)
*F02C 7/20* (2006.01)

(52) U.S. Cl.
CPC ............ *F02C 7/20* (2013.01); *F01D 11/24* (2013.01); *F02C 7/12* (2013.01); *F05D 2220/32* (2013.01);
(Continued)

(58) Field of Classification Search
CPC . F01D 9/06; F01D 11/14; F01D 11/24; F01D 25/14; F01D 25/243; F01D 25/28;
(Continued)

(56) References Cited

U.S. PATENT DOCUMENTS 3,027,715 A    4/1962  Sidney
3,826,088 A    7/1974  Nash et al.
(Continued)

FOREIGN PATENT DOCUMENTS

CN    203214171 U    9/2013
DE    102009026018 A1    12/2009
WO    2013001246 A1    1/2013

OTHER PUBLICATIONS

English Translation to Abstract for WO2013001246, Jan. 3, 2013.
(Continued)

*Primary Examiner* — Igor Kershteyn
(74) *Attorney, Agent, or Firm* — Cantor Colburn LLP

(57) ABSTRACT

A bracket includes a rigid member and a resilient member for coupling a coolant collector to a coolant supply manifold. The coolant collector is movable between a first position and a second position with respect to the coolant supply manifold due to thermal heating. The resilient member defines an anchoring portion and a cantilevered portion. The anchoring portion couples the cantilevered portion to a midsection of the rigid member for urging the coolant collector toward the coolant supply manifold in the first and second positions.

14 Claims, 5 Drawing Sheets

(52) U.S. Cl.
CPC ...... *F05D 2240/14* (2013.01); *F05D 2260/20* (2013.01); *F05D 2260/30* (2013.01); *F05D 2260/94* (2013.01)

(58) Field of Classification Search
CPC .......... F02C 7/12; F02C 7/20; F05D 2220/32; F05D 2230/642; F05D 2240/14; F05D 2250/75; F05D 2260/30; F05D 2260/94; F05D 2260/96
See application file for complete search history.

(56) References Cited

U.S. PATENT DOCUMENTS

| | | | | |
|---|---|---|---|---|
| 4,040,589 | A | * | 8/1977 | McLay ...................... E04B 1/49 248/217.1 |
| 4,271,650 | A | | 6/1981 | Lynn-Jones |
| 4,422,288 | A | * | 12/1983 | Steber ...................... F01D 9/023 60/39.37 |
| 4,805,851 | A | | 2/1989 | Herbst |
| 4,826,397 | A | * | 5/1989 | Shook ...................... F01D 11/24 415/116 |
| 5,197,250 | A | | 3/1993 | Cramer |
| 5,281,085 | A | * | 1/1994 | Lenahan ................. F01D 11/24 415/116 |
| 5,395,211 | A | | 3/1995 | Johnson |
| 5,414,999 | A | * | 5/1995 | Barnes ................... F01D 9/023 60/722 |
| 5,540,547 | A | * | 7/1996 | Cole ....................... F01D 11/24 24/339 |
| 6,185,925 | B1 | * | 2/2001 | Proctor .................. F01D 11/24 415/177 |
| 6,896,038 | B2 | * | 5/2005 | Arilla ...................... F01D 11/24 165/47 |
| 6,904,756 | B2 | * | 6/2005 | MacK ..................... F01D 9/023 60/796 |
| 8,092,146 | B2 | * | 1/2012 | Legare ................... F01D 11/24 415/1 |
| 2005/0257529 | A1 | | 11/2005 | Arbona |
| 2009/0321608 | A1 | | 12/2009 | Melton et al. |
| 2014/0030066 | A1 | | 1/2014 | Schimmels et al. |

OTHER PUBLICATIONS

English Translation to CN203214171, Sep. 25, 2013.
European Search Report for Application EP 15 74 6904, dated Sep. 11, 2017.
International Search Report for International Applicatin No. PCT/US2015/011579; dated Apr. 30, 2015.
Written Opinion for International Applicatin No. PCT/US2015/011579; dated Apr. 30, 2015.

* cited by examiner

BRACKETS FOR GAS TURBINE ENGINE COMPONENTS

RELATED APPLICATIONS

This application is a National Phase Application of Patent Application PCT/US2015/011579 filed on Jan. 15, 2015, which claims the benefit of and priority to U.S. Provisional Patent Application Ser. No. 61/935,703 filed Feb. 4, 2014, the contents each of which are incorporated herein by reference in their entirety.

BACKGROUND OF THE INVENTION

1. Field of the Invention

The present disclosure relates to joining gas turbine engine components, and more particularly to brackets for joining clearance control coolant collectors to coolant manifolds.

2. Description of Related Art

Gas turbine engines commonly have clearance control systems for controlling the radial clearance between rotating blade tips and surrounding engine structure. Clearance control systems provide a flow of coolant to engine components exposed to high temperatures, such as the engine turbine case for example. Such systems typically include a coolant duct, coolant collector, and a coolant manifold. The coolant duct couples to the coolant collector and the coolant collector couples to the coolant manifold. A support extends radially between engine structure subject to heating, such as a compressor or turbine case, and couples to the coolant duct for supporting the weight of the coolant duct. One or more brackets couple the coolant collector to the coolant supply manifold.

Such conventional methods and systems have generally been considered satisfactory for their intended purpose. However, there is still a need for improved brackets for coupling the coolant collector to the coolant manifold. The present disclosure provides a solution for this need.

SUMMARY OF THE INVENTION

A bracket includes a rigid member and a resilient member for coupling a coolant collector to a coolant supply manifold. The coolant collector is movable between a first position and a second position with respect to the coolant supply manifold due to thermal heating. The resilient member defines an anchoring portion and a cantilevered portion. The anchoring portion couples the cantilevered portion to a midsection of the rigid member for urging the coolant collector toward the coolant supply manifold in the first and second positions.

In certain embodiments, the rigid member can define a longitudinally extending interface portion and stiffening portion. The stiffening portion can couple to the interface portion at an angle and join the interface portion at 90 degrees or other suitable angle. The bracket can have a stiffness of greater than about 3500 pounds per square inch (613 newtons per millimeter). The rigid member can displace about 0.05 inches (about 0.13 centimeters) when moving between the first and the second positions.

In accordance with certain embodiments, the cantilevered portion of the resilient member can overhang an end of the rigid member. The cantilevered portion can be a first cantilevered portion and the bracket can include a second cantilevered portion. The first and second cantilevered portions can couple to opposite ends of the anchoring portion of the resilient member. Either or both of the cantilevered portions can be parallel to the interface portion of the rigid member. Fasteners can fix the anchoring portion of the resilient member to the midsection of the rigid member.

It is further contemplated that in certain embodiments the ends of the rigid member and the cantilevered portion can define respective apertures. The apertures can be registered with one another to be aligned relative to a common axis. It is also contemplated that the apertures can be spread apart from one another along the axis.

A clearance control system for a gas turbine engine includes a bracket as described above, a coolant supply manifold, a coolant collector, and a fastener. The coolant collector displaces relative to the coolant supply manifold between the first and second positions due to thermal expansion. The fastener extends through the cantilevered portion of the bracket and seats in the coolant supply manifold, thereby fixing the cantilevered portion of the bracket with respect to the coolant supply manifold for applying a force for urging the coolant collector toward the coolant supply manifold in the first and second positions due to low-frequency thermal expansion cycles.

A gas turbine engine includes a bracket and clearance control system as described above and as well as a support. The support couples between the engine and coolant collector and displaces the coolant collector between the first and second positions due to thermal expansion. The bracket applies force to the coolant supply manifold for offsetting force applied to the coolant supply manifold by the support and has sufficient stiffness to resist high-frequency engine vibration.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
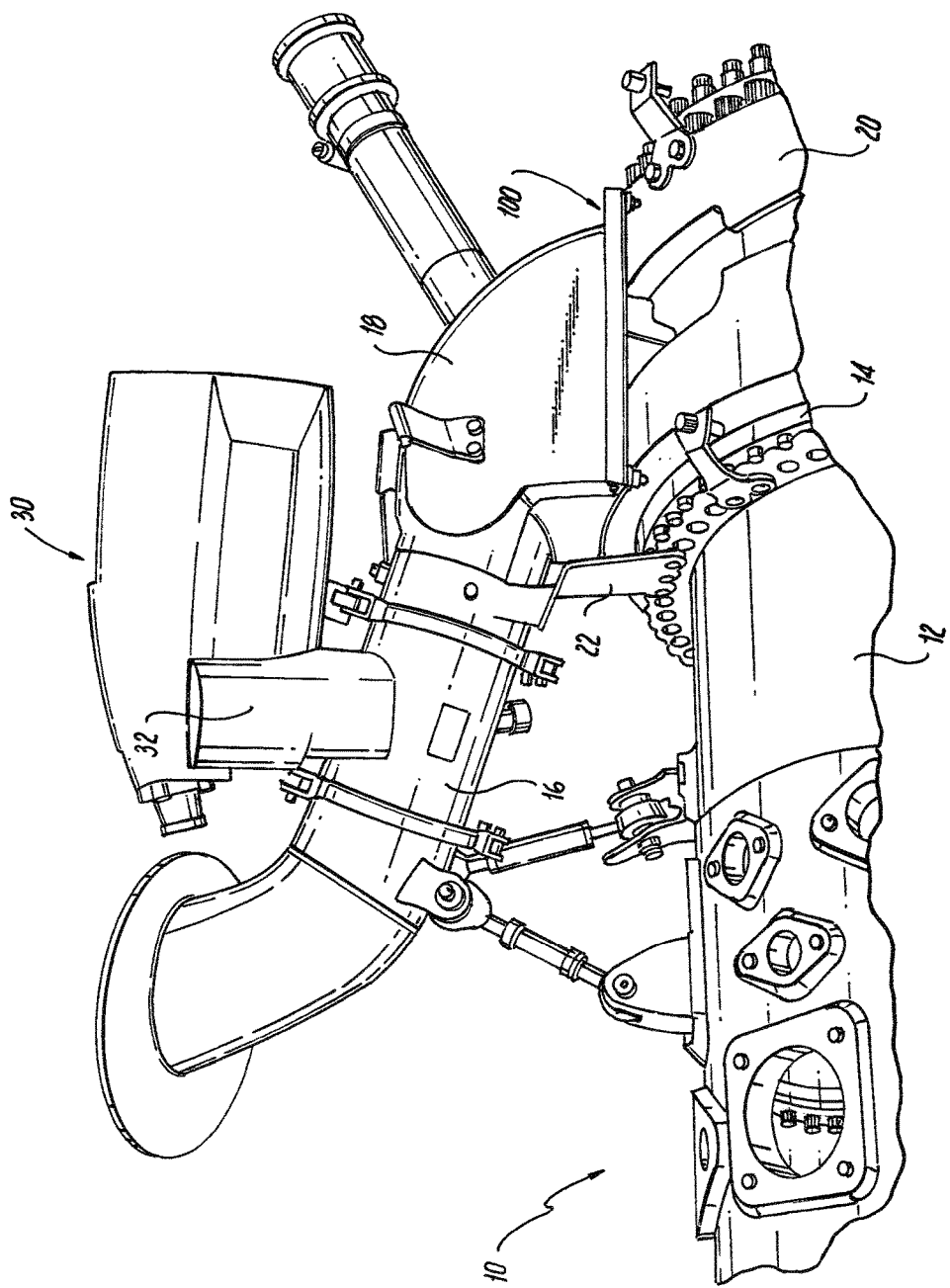
FIG. 1 is a side perspective view of a portion of gas turbine engine in accordance with the present disclosure, showing a bracket coupling a coolant collector to a coolant manifold.

Reference will now be made to the drawings wherein like reference numerals identify similar structural features or aspects of the subject disclosure. For purposes of explanation and illustration, and not limitation, a partial view of an exemplary embodiment of the bracket in accordance with the disclosure is shown in FIG. 1 and is designated generally by reference character 100. Other embodiments of the bracket in accordance with the disclosure, or aspects thereof, are provided in FIGS. 2-6B, as will be described. The systems and methods described herein can be used for coupling coolant collectors to coolant supply manifolds in gas turbine engines, for example.

With reference to FIG. 1, a portion of a gas turbine engine 10 is shown. Gas turbine engine 10 includes a compressor case 12, a turbine case 14, a coolant supply duct 16, a coolant collector 18, and a coolant supply manifold 20. Compressor case 12 and turbine case 14 enclose working fluid paths and blade tips in proximity with static structures requiring coolant for controlling thermal expansion to maintain blade tip clearances. Coolant supply duct 16 is in fluid communication with a coolant source such as the external environment. Coolant collector 18 is in fluid communication with coolant supply duct 16 and with coolant supply manifold 20, and is configured for supplying coolant thereto. Coolant supply manifold 20 surrounds turbine case 14 and is configured to distribute coolant received from coolant collector 18 into turbine case 14. Turbine case 14 includes passageways for distributing the coolant into internal structures requiring coolant.

A radially extending support 22 couples coolant supply duct 16 to gas turbine engine 10 and supports the weight of coolant supply duct 16. Bracket 100 couples coolant collector 18 to coolant supply manifold 20. During operation, compressor case 12 and turbine case 14 can become extremely hot. This heat can conduct into support 22, heating support 22 and causing it to thermally expand and contract. These thermal expansion cycles are typically low in frequency.

Because support 22 extends radially from gas turbine engine 10, heating and cooling support 22 causes it to lengthen and shorten. This can displace coolant collector 18 radially with respect to (away or towards) coolant supply manifold 20. When cool, support 22 drives coolant collector 18 to a first position where it is relatively close to coolant supply manifold 20 (shown in FIG. 5A). When hot, support 22 drives coolant collector 18 to a second position where it is displaced from coolant supply manifold 20 (shown in FIG. 6A) and forming a gap (exaggerated in size for purposes of clarity) between coolant collector 18 and coolant supply manifold 20 (as shown in FIG. 6B).

Bracket 100 is configured to urge coolant collector 18 toward coolant supply manifold 20 in the first and second positions and to resist low-frequency thermal expansion driven displacement events. Bracket 100 is also configured to resist high-frequency vibration that can be transmitted to coolant collector 18 through gas turbine engine 10. In embodiments, bracket 100 has a stiffness of about 3500 pounds per inch (about 613 newtons per millimeter). This can limit displacement of coolant supply manifold 20 to within about 0.05 inches (about 0.13 centimeters) with respect to coolant supply manifold 20 in the second position.

Figure 2:
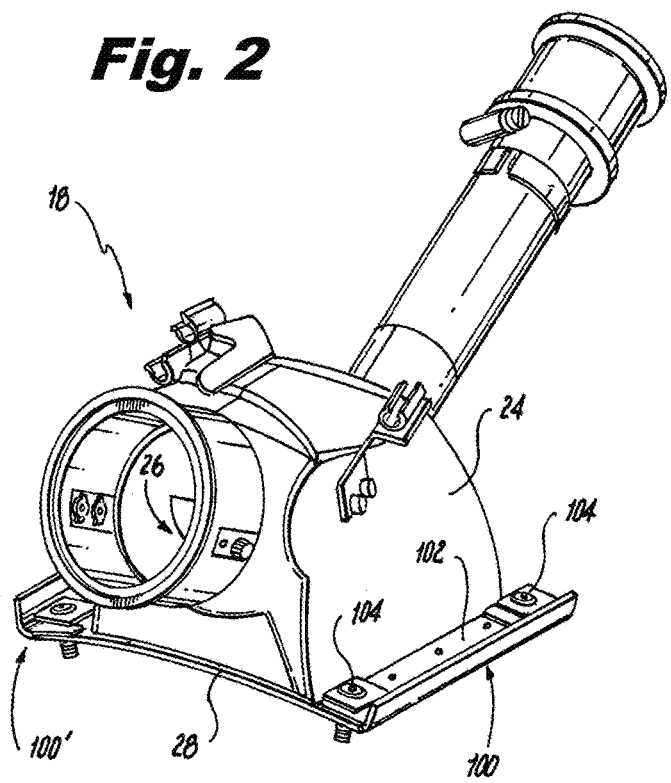
FIG. 2 is a perspective view of the bracket of FIG. 1, showing the bracket coupled to the coolant collector.

With reference to FIG. 2, coolant collector 18 and bracket 100 are shown. Coolant collector 18 has a collector body 24 with an inlet 26 and a flange 28. Inlet 26 is configured for sealably coupling to coolant supply duct 16 and receiving coolant therefrom. Flange 28 extends about a lower periphery of collector body 24 and is configured for coupling to coolant supply manifold 20 and providing a coolant flow thereto.

Bracket 100 seats over a portion of flange 28. A second bracket 100' seats over a portion of flange 28 on an opposite side of flange 28. Bracket 100 includes a longitudinally extending bracket body 102 configured to be fixed to turbine case 14 (shown in FIG. 1) by fasteners 104 arranged on longitudinally opposed ends of bracket body 102. Bracket 100' is similar in construction to first bracket 100. Brackets 100 and 100' couple coolant collector 18 to coolant supply manifold 20, forming a joint between the respective engine component and engine structure.

Figure 3:
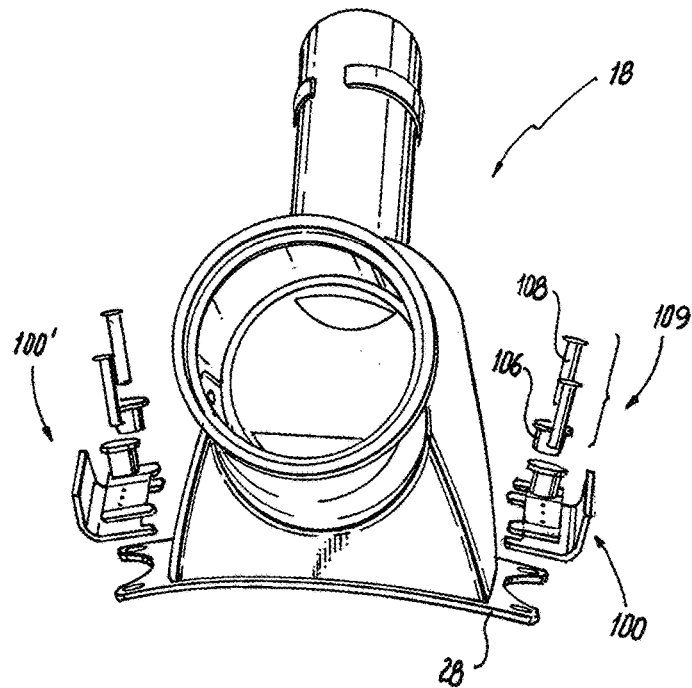
FIG. 3 is a perspective exploded view of the bracket of FIG. 1, showing the bracket components.

With reference to FIG. 3, coolant collector 18 is shown with brackets 100 and 100' in exploded view. Fasteners 104 include a bushing 106 and a threaded bolt 108, only one of each referenced in FIG. 3. Bushing 106 defines a flange and an aperture, the flange being a circumferential flange disposed on a radially outer end of the bushing and the aperture extending radially through the bushing along an axis of the bushing. Bushing 106 is configured for seating against coolant supply manifold 20 on its radially inner end, fixing a portion of bracket 100 on its outer end. Bushing 106 receives bolt 108 in its aperture that fixes bushing 106 to coolant supply manifold 20.

Figure 4A:
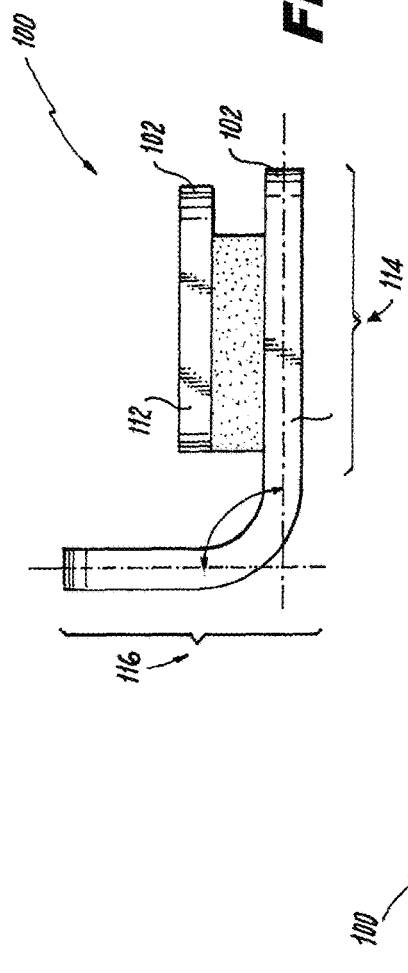
FIGS. 4A-4C are end, plan, and side views of the bracket of FIG. 1, showing the bracket rigid and resilient members, respectively.

With reference to FIG. 4A, bracket 100 is shown in a longitudinal end view. Bracket 100 includes a rigid member 110 and a resilient member 112. Rigid member 110 defines an interface portion 114 and a stiffening portion 116. Interface portion 114 connects to stiffening portion 116 along its edge and at an angle. The illustrated angle is about 90 degrees, but can be any suitable angle. Interface portion 114 couples along its lower face to an upper surface of flange 28 of coolant collector 18 (shown in FIG. 2). Stiffening portion 116 is integral with interface portion 114 and is configured for resisting bending interface portion 114 by force applied thereto by resilient member 112.

Figure 4B:
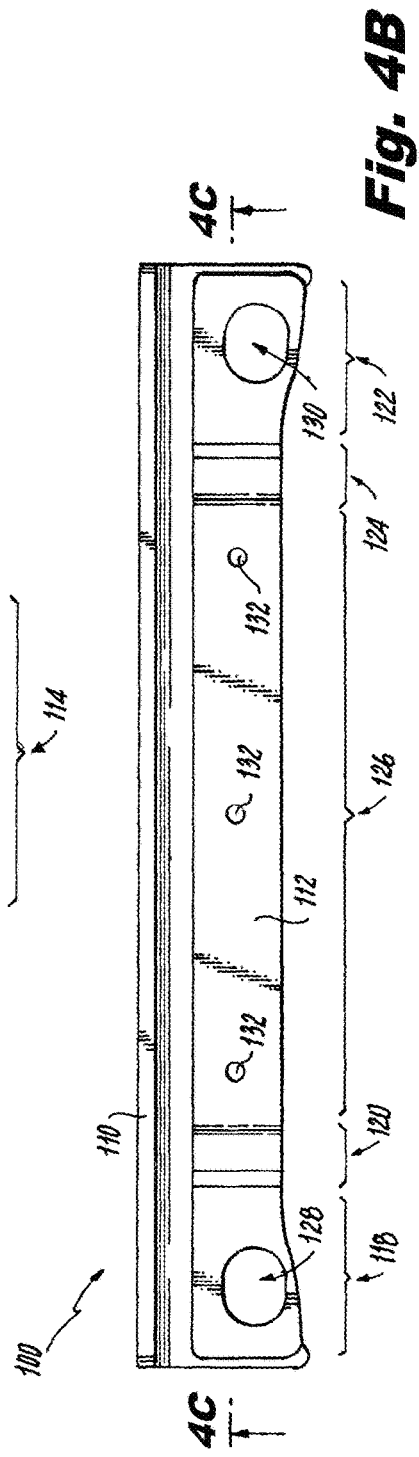

With reference to FIG. 4B, bracket 100 is shown in a plan view. Resilient member 112 has a first cantilevered portion 118, a first transition portion 120, a second cantilevered portion 122, a second transition portion 124, and an anchoring portion 126. First transition portion 120 joins first cantilevered portion 118 to anchoring portion 126. Second transition portion 124 joins second cantilevered portion 122 to anchoring portion 126. First and second transition portions 120 and 124 transmit force between first and second cantilevered portions 118 and 122 to anchoring portion 126, respectively. Resilient member 112 couples to rigid member 110 with fasteners 132 arranged along its longitudinal length. Fasteners 132 can be rivets or any other suitable type of fastener for coupling resilient member 112 to rigid member 110.

On its first end, bracket 100 has a first aperture 128 formed by axially aligned and spaced apart apertures defined by first cantilevered portion 118 of resilient member 112 and rigid member 110. On its opposite second end, bracket 100 has a second aperture 130 formed by registered apertures defined by second cantilevered portion 122 of resilient member 112 and rigid member 110. First and second apertures 128 and 130 are configured to seat bushings 106 such that first and second cantilevered portions 118 and 122 remain fixed with respect to coolant supply manifold 20 as coolant collector 18 moves between its first and second positions (shown in FIGS. 5A and 6A). This generates force which is transmitted through first and second transition portions 120 and 124 of bracket 100, into anchoring portion 126, and therefrom into rigid member 110 for opposing the displacement of coolant collector 18 from its first position to its second position.

Figure 4C:
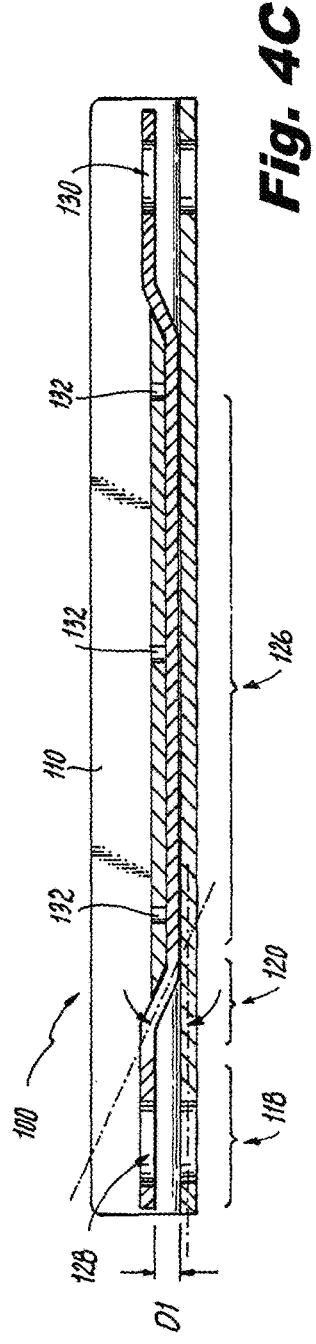

With reference to FIG. 4C, bracket 100 is shown unloaded, i.e. without any force applied to first and second cantilevered portions 118 and 122. First and second cantilevered portions 118 and 122 are each parallel to and offset from opposite ends of rigid member 110. First and second transition portions 120 and 124 have planar profiles and respectively intersect anchoring portion 126 and cantilevered portions 118 and 122 at acute angles.

Figure 5A:
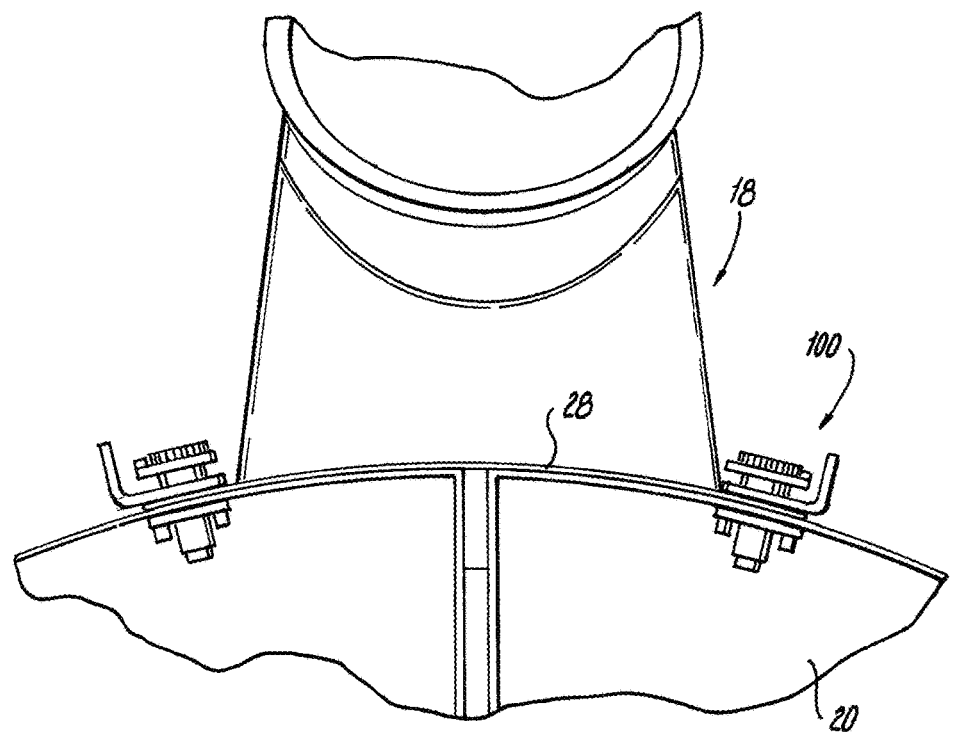
FIGS. 5A and 5B are end and perspective views of the bracket of FIG. 1, showing the bracket with the coolant collector in a first position, respectively.

With reference to FIG. 5A, coolant collector 18 is shown in its first position. In the first position, bracket 100 urges coolant collector 18 radially inward, toward coolant supply manifold 20. Flange 28 of coolant collector 20 contacts the outer surface of coolant supply manifold 20, and there is little or no gap between flange 28 and the surface of coolant supply manifold 20.

Figure 5B:
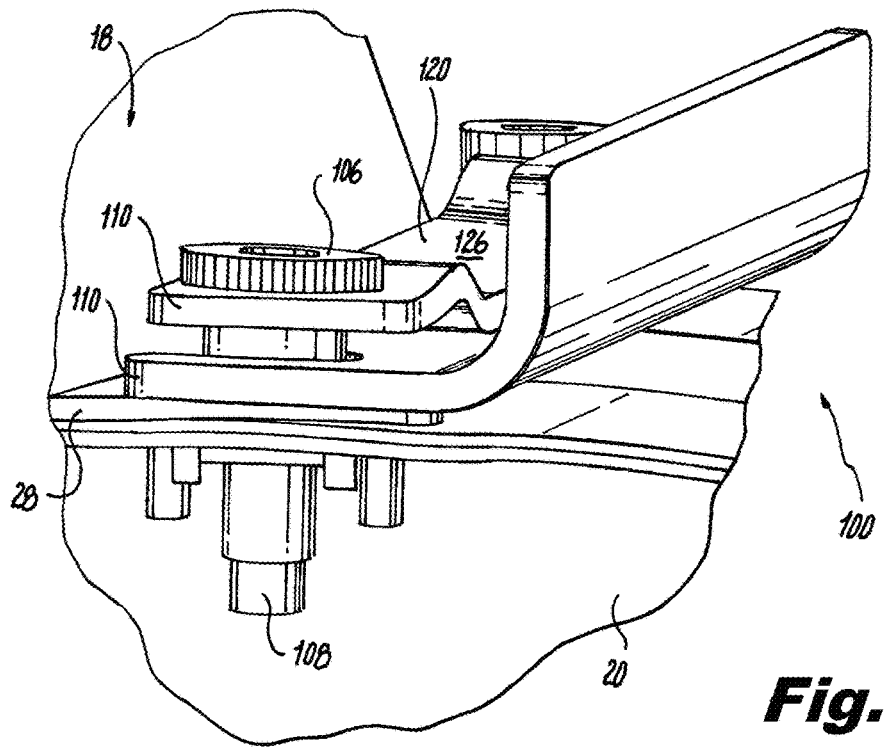

FIG. 5B shows a preload imposed on first cantilevered portions 118. Bolt 108 seats in coolant supply manifold 20 such that bushing 106 applies a force directed radially inward, i.e. toward coolant supply manifold 20. This displaces first cantilevered portion 118 radially inward and transfers the force into anchoring portion 126 through first transition portion 120. Anchoring portion 126 in turn transfers this force to rigid member 110. Rigid member 110 distributes this force across the portion of flange 28 it contacts, pressing flange 28 against the upper surface of coolant supply manifold 20. Since flange 28 is in intimate mechanical contact with coolant supply duct 20 in the first position, first transition portion deforms in response to the force, deforming from the planar profile shown in FIG. 4C to the arcuate profile shown in FIG. 5B. The deformation illustrated operates to maintain a seal between coolant collector 20 and coolant supply manifold 20 operative to resist displacement of coolant collector 20 therefrom from forces associated with vibration and thermal expansion of support 22 (shown in FIG. 1).

Figure 6A:
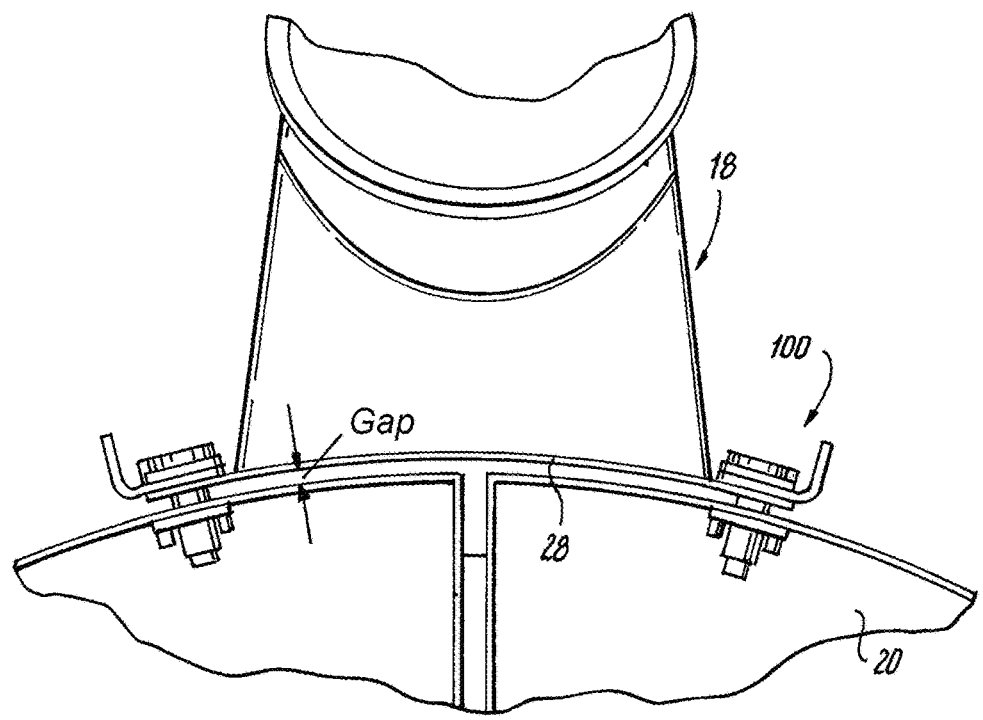
FIGS. 6A and 6B are end and perspective views of the bracket of FIG. 2, showing the bracket with the coolant collector in a second position, respectively.
Figure 6B:
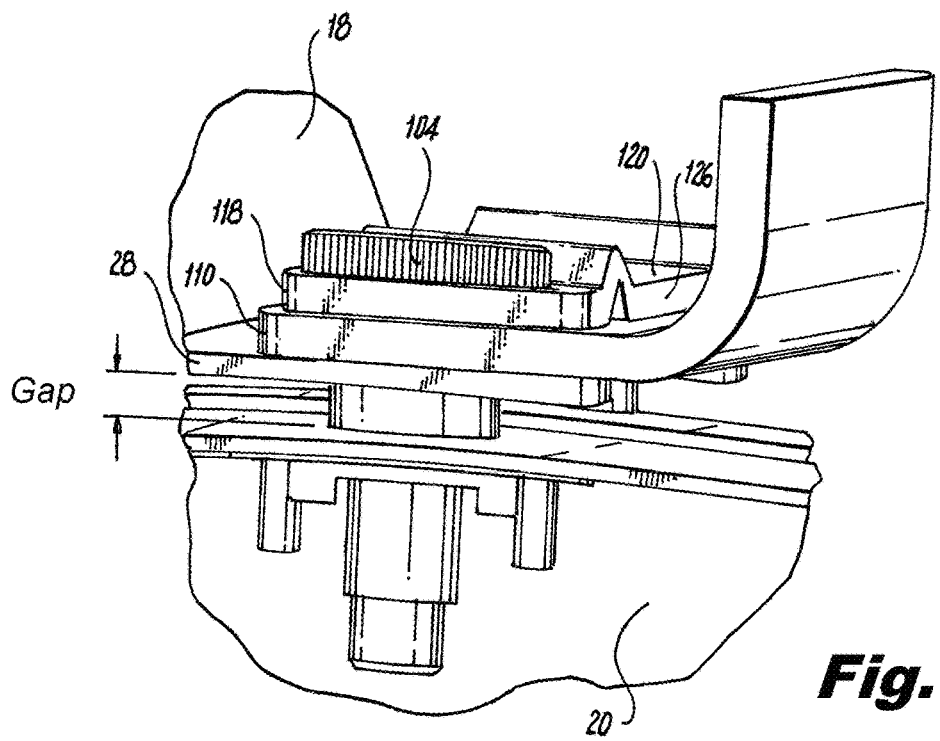

With reference to FIG. 6A, coolant collector 18 is shown in its second position. Thermal expansion of support 22 (shown in FIG. 1) urges coolant collector 18 radially outward and away from coolant supply manifold 20, thereby forming a gap between flange 28 and coolant supply manifold 20. Bracket 100 limits this displacement by applying an oppositely directed force. Specifically, with reference to FIG. 6B, thermal expansion of support 22 (shown in FIG. 1) drives coolant collector 18 radially outwards with respect to gas turbine engine 10. This drives flange 28 radially outwards with respect to gas turbine engine 10. Since the upper surface of flange 28 is in contact with the lower surface of rigid member 110, flange 28 applies a radially outward force to bracket 100. Since fastener 104 is fixed with respect to coolant supply manifold 20, fastener 104 generates an opposing force on first cantilevered portion 118 directed radially inward. First transition portion 120 transfers this force to anchoring portion 126, deforming and adopting a progressively more arcuate profile as the width of the gap increases.

As will be appreciated, coolant collector 18 can be part of a passive clearance control system. Coolant collector 18 can also be part of an active clearance control system 30 incorporating a coolant airflow valve 32 (each shown in FIG. 1) offset from gas turbine engine 10. As will be appreciated, the mass of coolant airflow valve 32 in conjunction with its position can make coolant control system 30 susceptible to different vibration frequencies than passive clearance control systems. Bracket 100 can be configured to generate sufficient force to dampen (control) both high-cycle stresses associated with operation of gas turbine engine 10 as well as low-cycle stresses resulting from thermal expansion and contraction of support 22 in both passive and active clearance control systems, thereby improving the expected fatigue life of system components such as support 22 in either type of clearance control system.

Embodiments of bracket 100 provide stiffness sufficient to address vibration driven high cycle fatigue associated with joints between gas turbine engine components and underlying structure, such as coolant collectors and coolant supply manifolds for example, as well as tolerate thermal growth driven low cycle fatigue stress associated with deflection of components in relation to the underlying engine structure. Embodiments of bracket 100 can also provide brackets with adequate stiffness not available through conventional helical springs as well as with a tolerance for deflection not available through conventional typical disk (Belleville) springs. As such, embodiments of bracket 100 can provide controlled stiffness between adjacent flanges while allowing for relative deflection between the flanges.

The methods and systems of the present disclosure, as described above and shown in the drawings, provide brackets for mounting gas turbine engine components to gas turbine engine structures to form joints with superior properties including the ability to dampen high frequency vibration and component deflection from thermal expansion and contraction cycles as well as to provide relatively low-profile and compact coupling structures. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A bracket, comprising:
a rigid member configured for coupling a coolant collector to a coolant supply manifold, wherein the coolant collector is movable between a first position and a second position spaced apart from the first position due to thermal expansion; and
a resilient member with an anchoring portion and a cantilevered portion, wherein the anchoring portion is coupled to the rigid member, wherein the cantilevered portion extends from the anchoring portion and overhangs an end of the rigid member for urging the coolant collector member toward the coolant supply manifold in both the first and second positions, wherein the rigid member and an end of the resilient member cantilevered portion define registered apertures.

2. A bracket as recited in claim 1, wherein the rigid member has longitudinally extending interface and stiffening portion, the interface portion fixed to the resilient member and the stiffening portion attached to and angled from the interface portion for resisting bending of the interface portion.

3. A bracket as recited in claim 2, wherein the stiffening portion is angled 90-degrees with respect to the interface portion.

4. A bracket as recited in claim 1, wherein the cantilevered portion is a first cantilevered portion and further including a second cantilevered portion extending from an opposite end of the anchoring portion.

5. A bracket as recited in claim 4, wherein the second cantilevered portion overhangs an end of the rigid member opposite the first cantilevered portion.

6. A bracket as recited in claim 4, wherein the first and second cantilevered portions are parallel to the rigid member in both the first and second manifold positions.

7. A bracket as recited in claim 1, further including a transition portion oblique with respect to the rigid member coupling the anchoring portion to the cantilevered portion.

8. A bracket as recited in claim 1, wherein the bracket has a stiffness greater than 3500 pounds per inch (613 newtons per millimeter).

9. A bracket as recited in claim 1, wherein the registered apertures are axially offset from one another.

10. A clearance control system for a gas turbine engine, comprising:
a coolant supply manifold;
a coolant collector displaceable between first and second positions in relation to the coolant supply manifold due to thermal expansion;
a bracket coupling the coolant collector to the coolant supply manifold, including:
a rigid member overlying the coolant collector; and
a resilient member with an anchoring portion and a cantilevered portion, wherein the anchoring portion couples the cantilevered portion to the rigid member, wherein the cantilevered portion overhangs an end of the rigid member; and
a fastener extending through the cantilevered portion and seated in the coolant supply manifold, wherein the fastener fixes the cantilevered portion with respect to the coolant supply manifold for applying force to and urging the coolant collector toward the coolant supply manifold in the first and second coolant collector positions.

11. A system as recited in claim 10, wherein the rigid member has longitudinally extending interface and stiffening portion, the interface portion fixed to the resilient member and the stiffening portion attached to and angled from the interface portion for resisting bending of the interface portion in the first and second positions.

12. A system as recited in claim 11, wherein the stiffening portion is angled 90-degrees with respect to the interface portion.

13. A gas turbine engine, comprising:
a turbine case;
a coolant supply manifold extending about the turbine case;
a coolant collector coupled to the turbine case with a support, wherein the support displaces the coolant collector from a first position to a second position due to thermal expansion;
a bracket coupling the coolant collector to the coolant supply manifold, including:
a rigid member overlying the coolant collector;
a resilient member with an anchoring portion and a cantilevered portion, wherein the anchoring portion couples the cantilevered portion to the rigid member, wherein the cantilevered portion overhangs an end of the rigid member; and
a fastener extending through the cantilevered portion and seated in the coolant supply manifold, wherein the fastener fixes the cantilevered portion with respect to the coolant supply manifold for applying force urging the coolant collector toward the coolant supply manifold in the first and second coolant collector positions.

14. An engine as recited in claim 13, wherein the rigid member has longitudinally extending interface and stiffening portion each orthogonal with respect to the support, the interface portion fixed to the resilient member and the stiffening portion attached to the interface portion at an angle for resisting bending of the interface portion in the first and second positions.

* * * * *